US009759991B2

United States Patent
Sheng (10) Patent No.: US 9,759,991 B2
(45) Date of Patent: Sep. 12, 2017

(54) LASER ILLUMINATION ON PHOSPHOR FOR PROJECTION DISPLAY

(71) Applicant: Texas Instruments Incorporated, Dallas, TX (US)

(72) Inventor: Zhongyan Sheng, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 73 days.

(21) Appl. No.: 14/854,260

(22) Filed: Sep. 15, 2015

(65) Prior Publication Data
US 2016/0077419 A1    Mar. 17, 2016

Related U.S. Application Data

(60) Provisional application No. 62/050,954, filed on Sep. 16, 2014.

(51) Int. Cl.
G03B 21/20 (2006.01)
G03B 33/08 (2006.01)

(52) U.S. Cl.
CPC ....... *G03B 21/2073* (2013.01); *G03B 21/204* (2013.01); *G03B 33/08* (2013.01)

(58) Field of Classification Search
CPC .................................. G03B 21/20; H04N 9/31
See application file for complete search history.

(56) References Cited

U.S. PATENT DOCUMENTS

2014/0055754 A1* 2/2014 Chuang ................ G03B 21/005
353/20
2014/0240676 A1* 8/2014 Maes ................... G03B 21/204
353/20

* cited by examiner

*Primary Examiner* — Sultan Chowdhury
*Assistant Examiner* — Danell L Owens
(74) *Attorney, Agent, or Firm* — Michael A. Davis, Jr.; Charles A. Brill; Frank D. Cimino (57) ABSTRACT

An embodiment of an apparatus for image projection includes a laser providing a first color light, a plurality of dichroic polarizing beam splitters (DPBSs), a plurality of switchable half-wave plates paired with a respective DPBS and positioned between the laser and the respective DPBS, a quarter-wave plate backed by a mirror and positioned to receive a first beam from a respective DPBS, and a plurality of static phosphor devices that are each positioned to receive either the first beam or the second beam from a respective DPBS and to emit light in a respective color. The emitted light from the phosphor devices and the beam that is reflected from the mirror are directed towards an output by one or more respective DPBSs. A method switches the switchable half-wave plates as necessary to provide separate images in a plurality of colors.

8 Claims, 7 Drawing Sheets

LASER ILLUMINATION ON PHOSPHOR FOR PROJECTION DISPLAY

PRIORITY UNDER 35 U.S.C. §119(e) & 37 C.F.R. §1.78

This non-provisional application claims priority based upon the following prior U.S. provisional patent application(s): (i) "PROJECTOR WITH LASER ILLUMINATION ON STATIC PHOSPHOR," Application No.: 62/050,954, filed Sep. 16, 2014, in the name(s) of Zhongyan Sheng; which is hereby incorporated by reference in its entirety.

FIELD OF THE DISCLOSURE

Disclosed embodiments relate generally to the field of projectors that use laser light and methods of operating such projectors. More particularly, and not by way of any limitation, the present disclosure is directed to a method and device for providing laser illumination in a projector using static phosphor devices.

BACKGROUND

Figure 1:
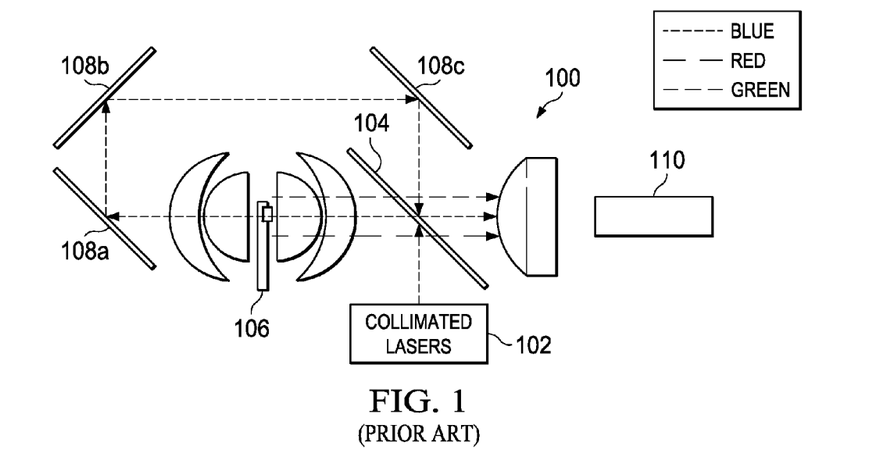
FIG. 1 depicts a functional block diagram of an example prior art apparatus for image projection.

Projectors with laser phosphor illuminations usually need a rotating phosphor wheel to change colors. An example of a prior art projection system is illustrated in FIG. 1. Projection system 100 uses collimated lasers 102 to provide illumination. Blue lasers are generally used, as these are the most economical lasers available for exciting the desired visible light, with phosphor devices used to generate the remaining colors. In this illustration, the blue light is directed at dichroic mirror 104, which is selected to reflect the blue color, but transmit other colors. When the blue light is reflected from dichroic mirror 102, the light is directed to phosphor wheel 106, which is rapidly rotating. It will be understood that the "wheel" potion of phosphor wheel 106 lies in a plane perpendicular to the illustration, such that the laser light will fall on only a small portion of the wheel near the outer edge. Typically, one section of phosphor wheel 106 contains a phosphor that will emit a green light; another section contains a phosphor that will emit a red light, and a third section contains an opening that allows the blue light to pass unimpeded. When the laser strikes one of the two phosphors, the emitted light will be directed back towards dichroic mirror 104, which will allow these two colors to pass on into light tunnel 110. When the light moves through the opening in phosphor wheel 106, the blue light cannot be directed back along the same path, as the light would be reflected back to the source. Instead, the blue color is directed to mirrors 108, which provide a path for the blue light to wrap around the phosphor wheel and be reflected off dichroic mirror 104 towards light tunnel 110. Various optical lenses are also illustrated in the figure; as one skilled in the art will understand their use, the lenses are not explained herein. Rotating phosphor wheel 106 requires a motor (not specifically shown) to drive the device, which consumes power. The wheel is also difficult to put into tight space for compact projectors. As projectors move towards smaller, more portable devices, it is highly desirable to have a method of providing a laser-illuminated projector that requires less space and uses less energy.

SUMMARY

A projector is disclosed that uses multiple beam switching devices to direct the illuminating laser between different optical paths where different colors of static phosphor devices are placed. The beam can be switched quickly, avoiding the need for a rotating wheel while still providing the rich colors the user desires.

In one aspect, an embodiment of an apparatus for image projection is disclosed. The apparatus includes a laser providing a first color light; a plurality of dichroic polarizing beam splitters (DPBSs), each DPBS operable to split the first color light into a first beam and a second beam in dependence on the polarization of the first color light; a plurality of switchable half-wave plates, each switchable half-wave plate being paired with a respective DPBS and positioned between the laser and the respective DPBS; a quarter-wave plate backed by a mirror and positioned to receive a first beam from a respective DPBS, the beam that is reflected from the mirror being directed towards an output by at least the respective DPBS; and a plurality of static phosphor devices, each static phosphor device positioned to receive one of the first beam and the second beam from a respective DPBS and to emit light in a respective color, the emitted light being directed towards the output by one or more of the DPBSs.

In another aspect, an embodiment of an apparatus for image projection is disclosed. The apparatus includes a laser aligned to provide a first color light; a dichroic polarizing beam splitter (DPBS) operable to split the first color light into a first beam and a second beam in dependence on the polarization of the first color light; a switchable half-wave plate positioned between the laser and the DPBS; a quarter-wave plate backed by a mirror and positioned to receive the first beam from the DPBS, the first beam that is reflected from the mirror being directed towards an output by the DPBS; and a phosphor device positioned to receive the second beam from the DPBS and to emit light in a plurality of colors in dependence on the rotation of the phosphor device, the emitted light being directed towards the output by the DPBS.

In yet another aspect, an embodiment of a method of operating a projection system that uses a laser is disclosed. The method includes directing a first color light towards a first dichroic polarizing beam splitter (DPBS) of a plurality of DPBSs, each additional DPBS of the plurality of DPBSs being situated to receive a beam from a DPBS that is closer to the laser; controlling a plurality of switchable half-wave plates such that during a first period the first color light is directed toward a quarter-wave plate backed by a mirror, during a second period the first color light is directed toward a first static phosphor device, and during a third period the first color light is directed toward a second static phosphor device; and directing the light returning from the quarter-wave plate and from first and second static phosphor devices toward an output.

Advantages of the disclosed device and method include at least the following; however, it will be understood that not all embodiments share all advantages:

Allows solid-state operations with no moving parts;

Blue wrapping optics are unnecessary;

Can provide a thin profile of less than 10 mm thickness;

Allows additional phosphor devices for better color;

Allows additional laser(s) for higher brightness;

Allows flexible laser power distribution for color/brightness control.

Both light tunnel and fly's eye lens array can be used for illumination homogenization;

Phosphor drum can be used to reduce thickness; and

Can be scaled as necessary.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
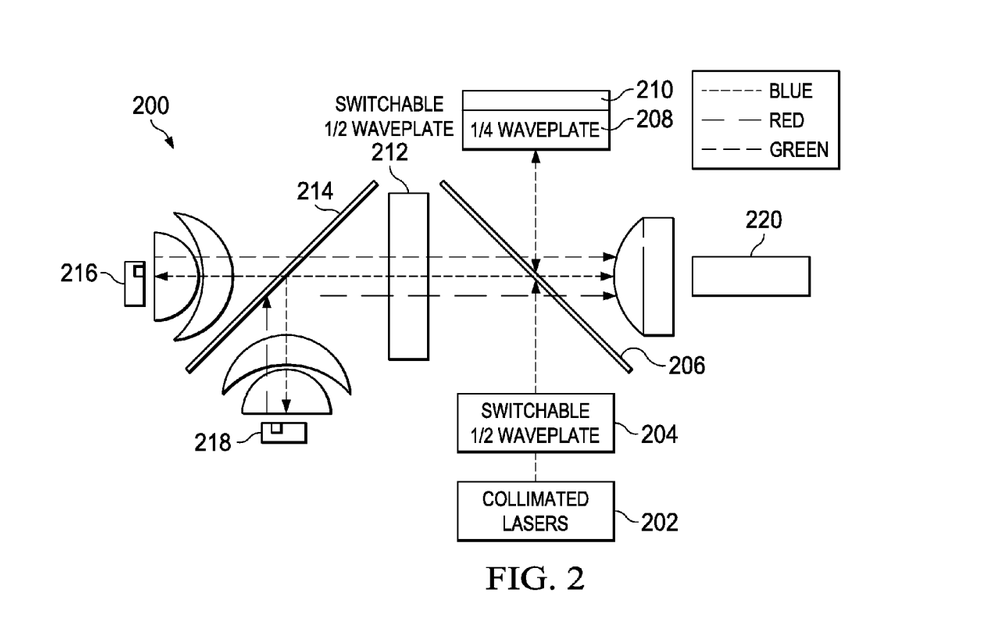
FIG. 2 depicts a functional block diagram of an apparatus for image projection according to an embodiment of the disclosure.

Referring now to the drawings and more particularly to FIG. 2, a functional block diagram of a projection device is shown according to an embodiment of the disclosure. Collimated lasers 202 provide a single color of light, typically blue light. In this embodiment, mirror 206 is a Dichroic Polarizing Beam Splitter (DPBS). This means that the mirror is not only selected to treat different wavelengths of light differently (dichroic), but can also split a single color depending on the polarization of the light (polarizing beam splitting). DPBS 206 is chosen to split the blue light, and in the disclosed embodiment, blue light having a first polarization is transmitted, while blue light having a second polarization is reflected. DPBS 206 is also chosen to transmit colors other than blue, e.g., green and red. Located between lasers 202 and DPBS 206 is a switchable half-wave plate 204, which can be turned on and off very quickly. When the half-wave plate 204 is on, the polarization direction of the blue light passing through half-wave plate 204 is rotated. Therefore, by switching half-wave plate 204 on and off, the blue light can be directed to either pass through DPBS 206 or be reflected by DPBS 206. When the blue light from laser 202 is transmitted through DPBS 206, the light will pass through quarter-wave plate 208 and strike mirror 210, then reflect back through quarter-wave plate 208. A quarter-wave plate will transform a light that is linearly polarized into a light that is circularly polarized. By passing the light back through quarter-wave plate 208, the circular polarization is transformed back into a linear polarization, but the polarization is rotated from its original polarization. Because of this rotation, the blue light that was transmitted by DPBS 206 will now be reflected towards light tunnel 220.

When the blue light from lasers 202 is reflected from DPBS 206, the light will pass through a second switchable half-wave plate 212 and be directed to a second DPBS 214. DPBS 214 is selected to have somewhat different properties from DPBS 206. In the disclosed embodiment, DPBS 214 will selectively transmit or reflect the blue light, depending on the polarization of the blue light, will transmit green light, and reflect a red light. Thus, when the blue light is directed through DPBS 214, the light will strike static phosphor device 216, which emits green light. The green light will be transmitted through DPBS 214, wave plate 212, and DPBS 206 into light tunnel 220. When the blue light is directed to reflect from DBPS 214, the light will strike static phosphor device 218, which emits red light. The red light is directed back to DPBS 214, where it is reflected, passes through wave plate 212 and DPBS 206 into light tunnel 220.

Figure 2A:
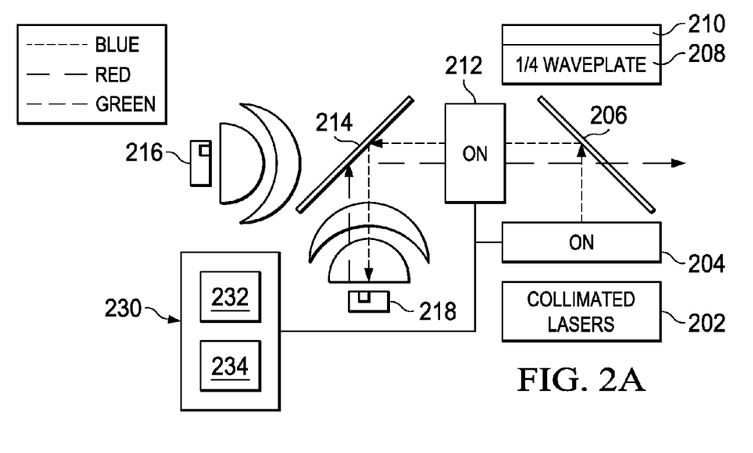
FIGS. 2A-D depicts the operation of the apparatus of FIG. 2 as the different colors are produced.
Figure 2B:
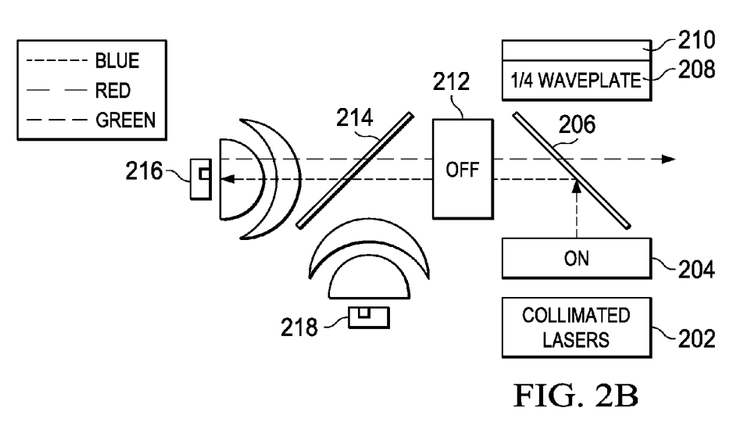
Figure 2C:
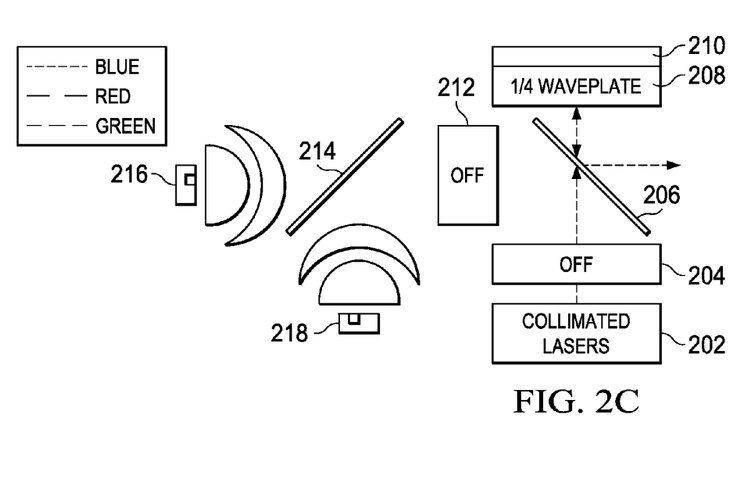

An example of the control of switchable wave plates 204 and 212 and the timing of the process is shown in FIGS. 2A-C. In this example, the projection apparatus will first produce an image using the red color, then an image using the green color and finally an image using the blue color; the sequence is repeated as long as a display is being produced. It will be understood that the timing is extremely fast, such that the human eye cannot distinguish the separate images, but sees a combined image in full color. Computer chip 230, which is shown only in FIG. 2A provides control of switchable half-wave plates 204, 212, as well as overall control of the projection processes. Computer chip 230 contains numerous functional elements, although only a microprocessor 232 and memory 234 are illustrated. Memory 234 will contain instructions that when executed by processor 232, provide the control of projection. FIG. 2A illustrates the time period during which a red image is produced. For the purpose of this discussion, it will be assumed that DPBS 206 and 214 are configured such that an "on" setting for either half-wave plate causes the blue light to be reflected by the DPBS and that an "off" setting causes the blue light to be transmitted. It will be understood by one skilled in the art that many other configurations can be designed to implement the same process. In projector device 200A, both wave plate 204 and wave plate 212 are turned on, causing the blue light to be reflected by both of DPBS 206 and 214. The light strikes static phosphor device 218, which produces red light. The red light is reflected by DPBS 214, but transmitted by DPBS 206.

Figure 2D:
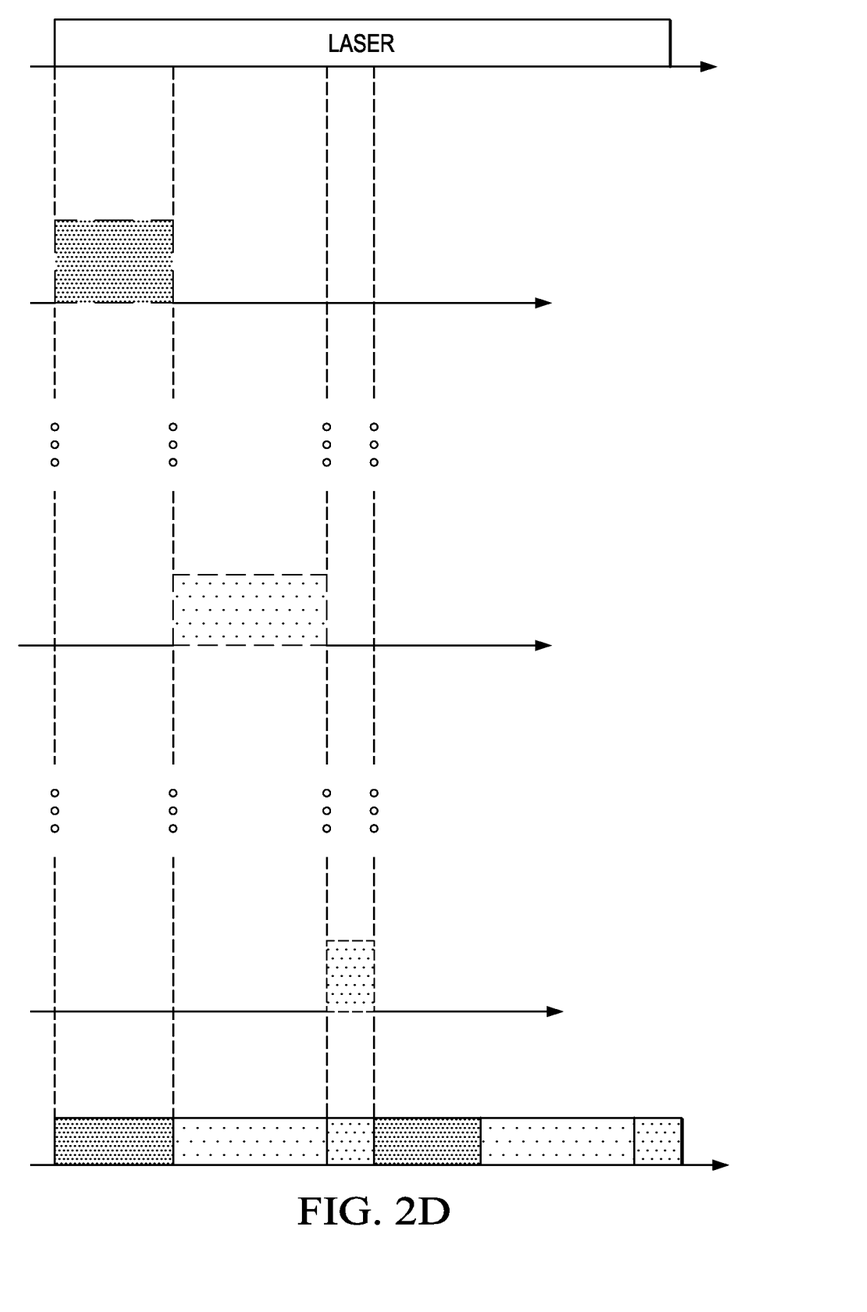

FIG. 2B illustrates the second time period, during which a green image is produced. In projector device 200B, wave plate 204 is turned on and wave plate 212 is turned off, causing the blue light to be reflected by DPBS 206 but transmitted by DPBS 214. The light strikes static phosphor device 216, which produces green light. The green light is transmitted by both of DPBS 214 and DPBS 206. FIG. 2C illustrates the third time period, during which a blue image is produced. In projection device 200C, both of wave plates 204, 212 are turned off, so that the blue light is transmitted by DPBS 206. The blue light passes through DPBS 206, passes through quarter-wave plate 208 and is reflected back through wave plate 208 by mirror 210. Since polarization of the blue light is transformed by passing twice through quarter-wave plate 208, the blue light will then be reflected by DPBS 206. FIG. 2D should be viewed in conjunction with FIGS. 2A-C, as this latter figure illustrates the time period allotted to the production of each color. In the embodiment illustrated in the figure, the first time period illustrates the red light produced in FIG. 2A; the second time period illustrates the green light produced in FIG. 2B; and the third time period illustrates the blue light produced in FIG. 2C. It can be seen from this illustration that the time periods allocated for the production of different colors are not necessarily equal, but can be adjusted as desired for the most pleasing color mix.

Figure 3:
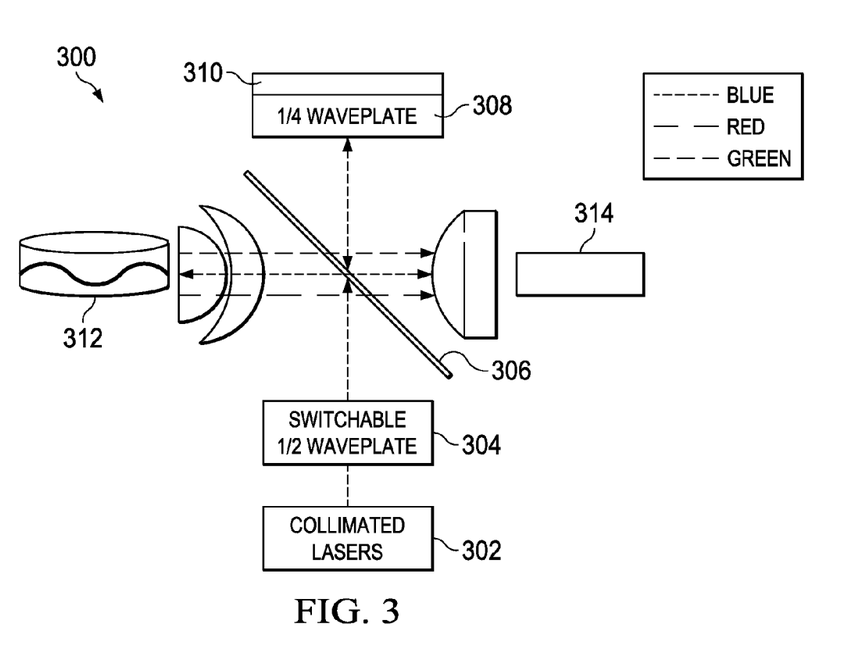
FIG. 3 depicts a functional block diagram of an apparatus for image projection according to another embodiment of the disclosure.

The use of static phosphor devices increases the reliability of the projection system, given that there are no moving parts. However, a layout similar to that of FIG. 2 can also be used with a phosphor drum or phosphor wheel to eliminate the need for the blue wrap illustrated in FIG. 1. FIG. 3 illustrates an embodiment using a phosphor drum, although it will be understood that a phosphor wheel can also be used if desired. In this figure, collimated lasers 302, switchable half-wave plate 304, DPBS 306, quarter-wave plate 308 and mirror 310 correspond to the elements having similar numbering in FIG. 2 and their operation is the same. However, when blue light is reflected from DPBS 306, it will strike phosphor drum 312, which is rotating to expose different phosphors at different times. During appropriate times, both green and red are emitted by phosphor drum 312 and are transmitted by DPBS 306 to enter light tube 314.

Figure 4:
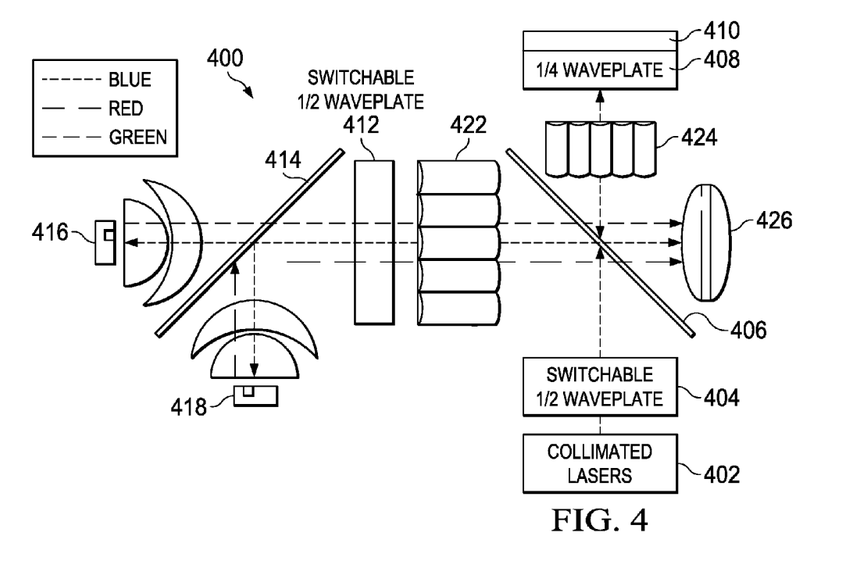
FIG. 4 depicts a functional block diagram of an apparatus for image projection according to an embodiment of the disclosure.
Figure 5:
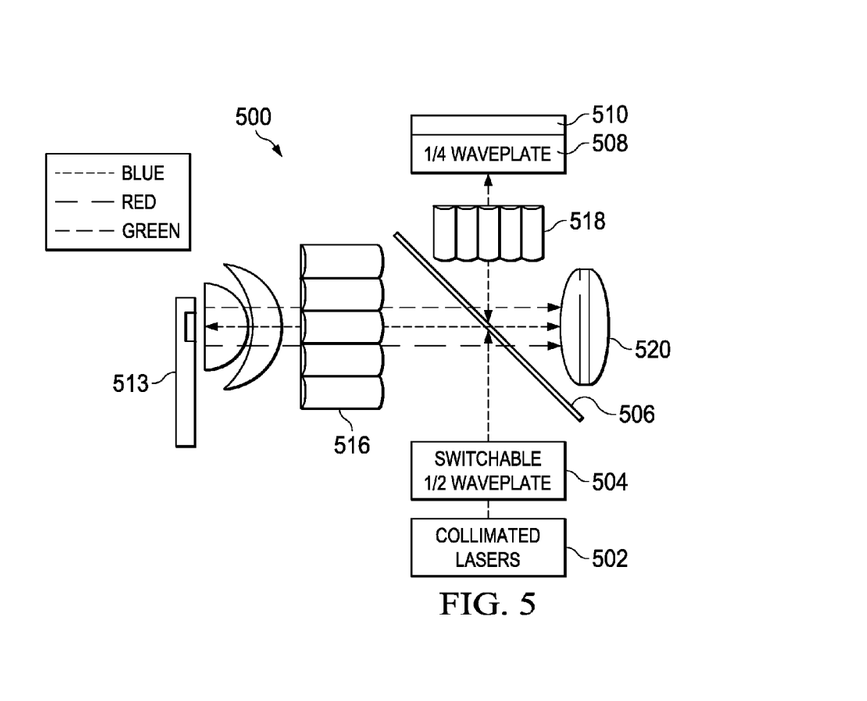
FIG. 5 depicts a functional block diagram of an apparatus for image projection according to an embodiment of the disclosure.

In both FIGS. 2 and 3, the light tunnel can be replaced by a fly's eye integrator, also known as a homogenizer, to provide a uniform laser output. It can also be desirable to provide more uniform illumination of the phosphors, so that the heating of the phosphors is uniform. FIGS. 4 and 5 provide embodiments in which a fly's eye integrator is incorporated into the design such that both the illumination of the phosphor and the illumination that is finally output are uniform. Embodiment 400 is similar to the embodiment shown in FIG. 2 and contains collimated lasers 402, switchable half-wave plates 404, 412, quarter-wave plate 408 backed by mirror 410, DPBSs 406, 414 and static phosphor devices 416, 418, all of which correspond to the similarly numbered elements of embodiment 200. In addition, this embodiment includes two fly's-eye integrators 422 and 424, as well as relay lens 426. Fly's-eye integrator 422 lies between DPBS 406 and DPBS 414, so that both the blue light that is sent towards the static phosphor devices 416, 418 and the emitted green and red light sent back toward relay lens 426 passes through the fly's-eye integrator. Similarly, fly's-eye integrator 424 is added between DPBS 406 and quarter-wave plate 408 so that the blue light traverses this fly's-eye integrator twice prior to reaching relay lens 426. Relay lens 426 takes in the light that has been through the fly's eye integrator and forms a clear image onto a digital micro-mirror device (DMD) (not specifically shown) or other spatial light modulator. In at least one embodiment, the spatial light modulator is Liquid Crystal on Silicon (LCoS).

In at least one embodiment, the spatial light modulator is a Liquid Crystal Display. After the spatial light modulator, the light carries image information and the image is magnified by a projection lens to a screen with an image size suitable for viewing by human eyes.

Embodiment 500 is similar to the embodiment shown in FIG. 3 and contains collimated lasers 502, switchable half-wave plate 504, quarter-wave plate 508 backed by mirror 510, DPBS 506, and phosphor wheel (or drum) 513 that correspond to the similarly numbered elements of embodiment 300. Fly's-eye integrator 516 is added between DPBS 506 and phosphor wheel 513 such that both the blue light travelling towards phosphor wheel 513 and the emitted green and red light sent back towards relay lens 520 pass through fly's-eye integrator 516. Likewise, fly's-eye integrator 518 is added between DPBS 506 and quarter wave plate 508 such that the blue light travels twice through the fly's-eye integrator 518. Again, relay lens 520 takes in the light that has been through the fly's eye homogenizers and forms a clear image onto the DMD (not specifically shown) or other spatial light modulator.

Figure 6:
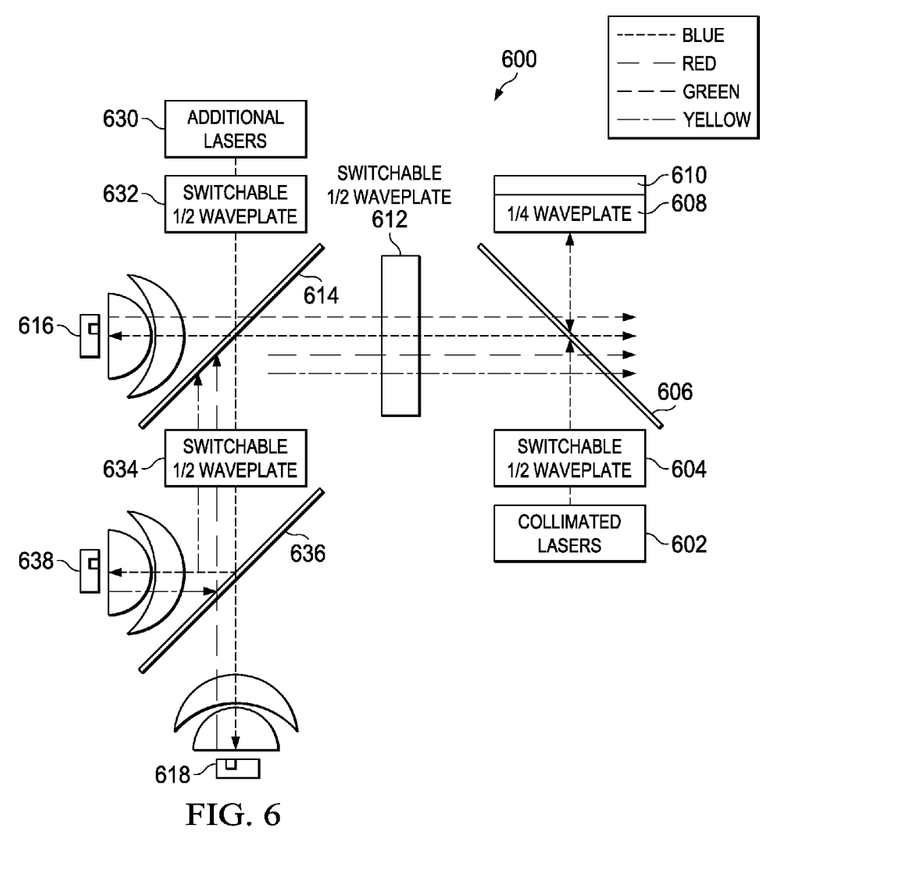
FIG. 6 depicts a functional block diagram of an apparatus for image projection according to a further embodiment of the disclosure.

In some embodiments of the disclosed projection device, it can be desirable to provide additional phosphor devices and/or additional lasers as a means of providing better color or a brighter illumination. The placement of a large number of laser lights in a single location can cause heating issues. As shown in FIG. 6, the disclosed design for static phosphor devices can be expanded to add additional lasers, additional static phosphor devices or both additional lasers and additional static phosphor devices while avoiding the heating issues. In embodiment 600, collimated lasers 602 are joined by additional lasers 630 and yellow static phosphor device 638 joins green static phosphor device 616 and red static phosphor device 618. Two additional switchable half-wave plates 632, 634 are added to the original switchable half-wave plates 604, 612 and one additional DPBS 636 is added to DPBSs 606, 614. It will be clear to one skilled in the art that by appropriately adjusting the polarization of the blue light from each of lasers 602 and 630, both lasers can be used to provide green illumination using static phosphor device 616, but that only laser 602 can be used to provide the blue illumination. It will also be clear that when both lasers 602 and 630 are on and being directed towards DPBS 636, one laser will be directed towards phosphor 618 while the other laser will be directed towards phosphor 638. For greater control of color and brightness, the power distribution between lasers 602 and lasers 630 can be adjusted as necessary. Using the disclosed embodiments, one skilled in the art would be able to design additional layouts with different arrangements of lasers and/or static phosphor devices.

Figure 7A:
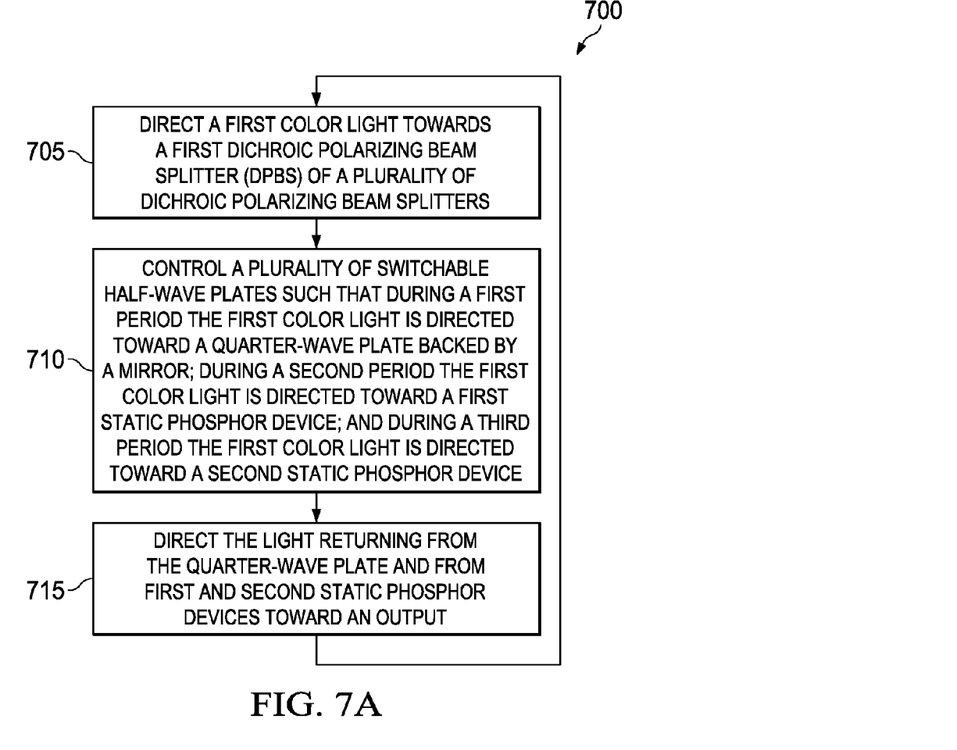
FIGS. 7A-C are flowcharts of a method of operating a projection system.
Figure 7B:
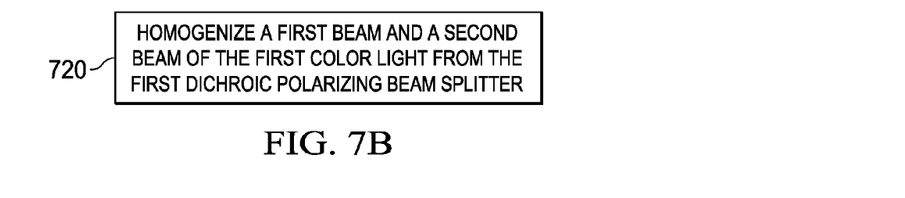
Figure 7C:
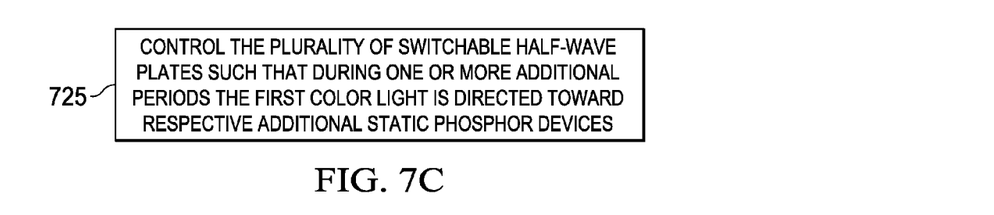

FIG. 7A is a flowchart depicting a method of operating a laser projection system, while FIGS. 7B and 7C illustrate additional elements that can be part of the method of FIG. 7A. Method 700 begins with directing (705) a first color light towards a first dichroic polarizing beam splitter (DPBS) of a plurality of DPBSs. As has been shown in the embodiments of FIGS. 2, 4 and 6, there are two DPBSs when three colors are used. Each additional color utilizes an additional DPBS. Except for the first DPBS, which is closest to the lasers, each successive DPBS is arranged to receive a beam from a DPBS nearer the lasers in the stream of light. The method continues with controlling (710) a plurality of switchable half-wave plates such that during a first period the first color light is directed toward a quarter-wave plate backed by a mirror, during a second period the first color light is directed toward a first static phosphor device, and during a third period the first color light is directed toward a second static phosphor device. The light returning from the quarter-wave plate and from first and second static phosphor devices is directed (715) toward an output. This process will repeat continuously as long as the projector is in use, continually providing new images to the output. The method can also include one or both of several additional elements. For example, the method can include homogenizing (720) a first beam and a second beam of the first color light from the first DPBS. In at least one embodiment, the light is homogenized twice, i.e., as the light travels in each direction. Additionally the method can include controlling (725) the plurality of switchable half-wave plates such that during one or more additional periods the first color light is directed toward respective additional static phosphor devices. One or both of elements 720, 725 can be added to flowchart 700 between element 710 and element 715.

Although various embodiments have been shown and described in detail, the claims are not limited to any particular embodiment or example. Moreover, none of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An apparatus for image projection comprising:
   a laser providing a first color light;
   a plurality of dichroic polarizing beam splitters (DPBSs), each DPBS operable to split the first color light into a first beam and a second beam in dependence on the polarization of the first color light;
   a plurality of switchable half-wave plates, each switchable half-wave plate being paired with a respective DPBS and positioned between the laser and the respective DPBS;
   a quarter-wave plate backed by a mirror and positioned to receive a first beam from a respective DPBS, the beam that is reflected from the mirror being directed towards an output by at least the respective DPBS; and
   a plurality of static phosphor devices, each static phosphor device positioned to receive one of the first beam and the second beam from a respective DPBS and to emit light in a respective color, the emitted light being directed towards the output by one or more of the DPBSs.

2. The apparatus as recited in claim 1 wherein the first color light is blue.

3. The apparatus as recited in claim 1 further comprising a computer chip connected to control the plurality of switchable half-wave plates, the computer chip containing a processor and instructions stored on the computer chip that when executed by the processor, switch the plurality of switchable half-wave plates such that during a first period the first color light is directed toward the quarter-wave plate backed by the mirror, during a second period the first color light is directed toward a first phosphor device of the plurality of phosphor devices and during a third period the first color light is directed toward a second phosphor device of the plurality of phosphor devices.

4. The apparatus as recited in claim 3 wherein the instructions when executed by the processor further switch the plurality of switchable half-wave plates such that during a fourth period the first color light is directed toward a third phosphor device of the plurality of phosphor devices.

5. The apparatus as recited in claim 3 further comprising:
   a first homogenizer located in the path of the first beam from the DPBS of the plurality of DPBSs nearest the lasers; and
   a second homogenizer located in the path of the second beam from the DPBS nearest the lasers.

6. A method of operating a projection system that uses a laser, the method comprising:
   directing a first color light towards a first dichroic polarizing beam splitter (DPBS) of a plurality of DPBSs, each additional DPBS of the plurality of DPBSs being situated to receive a beam from a DPBS that is closer to the laser;
   controlling a plurality of switchable half-wave plates such that during a first period the first color light is directed toward a quarter-wave plate backed by a mirror, during a second period the first color light is directed toward a first static phosphor device, and during a third period the first color light is directed toward a second static phosphor device; and
   directing the light returning from the quarter-wave plate and from first and second static phosphor devices toward an output.

7. The method as recited in claim 6 further comprising:
   homogenizing a first beam and a second beam of the first color light from the first DPBS.

8. The method as recited in claim 6 further comprising:
   controlling the plurality of switchable half-wave plates such that during one or more additional periods the first color light is directed toward respective additional static phosphor devices.

* * * * *